United States Patent
Srivastava et al.

(10) Patent No.: US 11,520,653 B2
(45) Date of Patent: Dec. 6, 2022

(54) SYSTEM AND METHOD FOR CONTROLLING FAULTS IN SYSTEM-ON-CHIP

(71) Applicant: NXP USA, Inc., Austin, TX (US)

(72) Inventors: Neha Srivastava, New Delhi (IN); Ankur Behl, New Delhi (IN); Garima Sharda, Beecave, TX (US)

(73) Assignee: NXP USA, Inc., Austin, TX (US)

( * ) Notice: Subject to any disclaimer, the term of this patent is extended or adjusted under 35 U.S.C. 154(b) by 134 days.

(21) Appl. No.: 17/071,941

(22) Filed: Oct. 15, 2020

(65) Prior Publication Data

US 2022/0121512 A1   Apr. 21, 2022

(51) Int. Cl.
*G06F 11/00* (2006.01)
*G06F 11/07* (2006.01)
*G06F 11/263* (2006.01)

(52) U.S. Cl.
CPC ........ *G06F 11/0793* (2013.01); *G06F 11/079* (2013.01); *G06F 11/0736* (2013.01); *G06F 11/0751* (2013.01); *G06F 11/263* (2013.01)

(58) Field of Classification Search
CPC ............. G06F 11/0793; G06F 11/0736; G06F 11/0751; G06F 11/079; G06F 11/263
USPC ...................................................... 714/1–57
See application file for complete search history.

(56) References Cited

U.S. PATENT DOCUMENTS

| | | | |
|---|---|---|---|
| 6,543,003 B1 | 4/2003 | Floyd et al. | |
| 6,745,345 B2 | 6/2004 | Cabezas et al. | |
| 7,415,634 B2 | 8/2008 | Anderson et al. | |
| 7,484,131 B2 | 1/2009 | Fields et al. | |
| 8,407,515 B2 | 3/2013 | Heyrman et al. | |
| 10,127,126 B2 | 11/2018 | Bhagwat et al. | |
| 2004/0078724 A1* | 4/2004 | Keller ................... G06F 30/398 714/48 |
| 2007/0234114 A1 | 10/2007 | Bailey et al. | |
| 2008/0307272 A1* | 12/2008 | Ozawa .................... H04L 41/06 714/48 |
| 2014/0122942 A1* | 5/2014 | Vilela ................. G06F 11/0793 714/48 |
| 2014/0189427 A1* | 7/2014 | Jayaprakash Bharadwaj .............. G06F 11/1415 714/15 |

(Continued)

OTHER PUBLICATIONS

U.S. Appl. No. 16/917,663, filed Jun. 30, 2020, entitled: System and Method for Testing Critical Components on System-on-Chip. The Examiner is referred to the copending patent prosecution of the common Applicant (no attachment).

(Continued)

*Primary Examiner* — Sarai E Butler

(57) ABSTRACT

A system-on-chip (SoC) is disclosed. The SoC includes a fault controlling circuit and processing circuits. The fault controlling circuit is configured to receive fault events generated by fault sources of the SoC and categorize the fault events based on a priority associated with each fault event. The fault controlling circuit is further configured to identify corresponding fault reactions for the categorized fault events and generate a set of recovery signals based on the identified fault reactions. The processing circuits are configured to receive the fault events, and further configured to receive the set of recovery signals to recover from the fault events. The fault controlling circuit thus acts as a central control system for controlling faults in the SoC.

18 Claims, 6 Drawing Sheets

(56) References Cited

U.S. PATENT DOCUMENTS

| | | | |
|---|---|---|---|
| 2015/0278043 A1* | 10/2015 | Maeda | H04L 1/20 |
| | | | 714/5.1 |
| 2015/0378859 A1* | 12/2015 | Jang | G06F 11/3684 |
| | | | 714/41 |
| 2017/0010991 A1 | 1/2017 | Natu et al. | |
| 2019/0108105 A1* | 4/2019 | Han | G06F 11/076 |
| 2019/0146862 A1* | 5/2019 | Kephart | G06F 11/0709 |
| | | | 714/2 |
| 2020/0166933 A1* | 5/2020 | Höfig | H04W 12/06 |
| 2020/0234513 A1* | 7/2020 | Aljanabi | G07C 5/0808 |

OTHER PUBLICATIONS

U.S. Appl. No. 17/003,457, filed Aug. 26, 2020, entitled: Method and System for Fault Collection and Reaction in System-on-Chip. The Examiner is referred to the copending patent prosecution of the common Applicant (no attachment).

U.S. Appl. No. 17/039,576, filed Sep. 30, 2020, entitled Method and System for Managing Fault Recovery in System-on-Chips. The Examiner is referred to the copending patent prosecution of the common Applicant (no attachment).

* cited by examiner

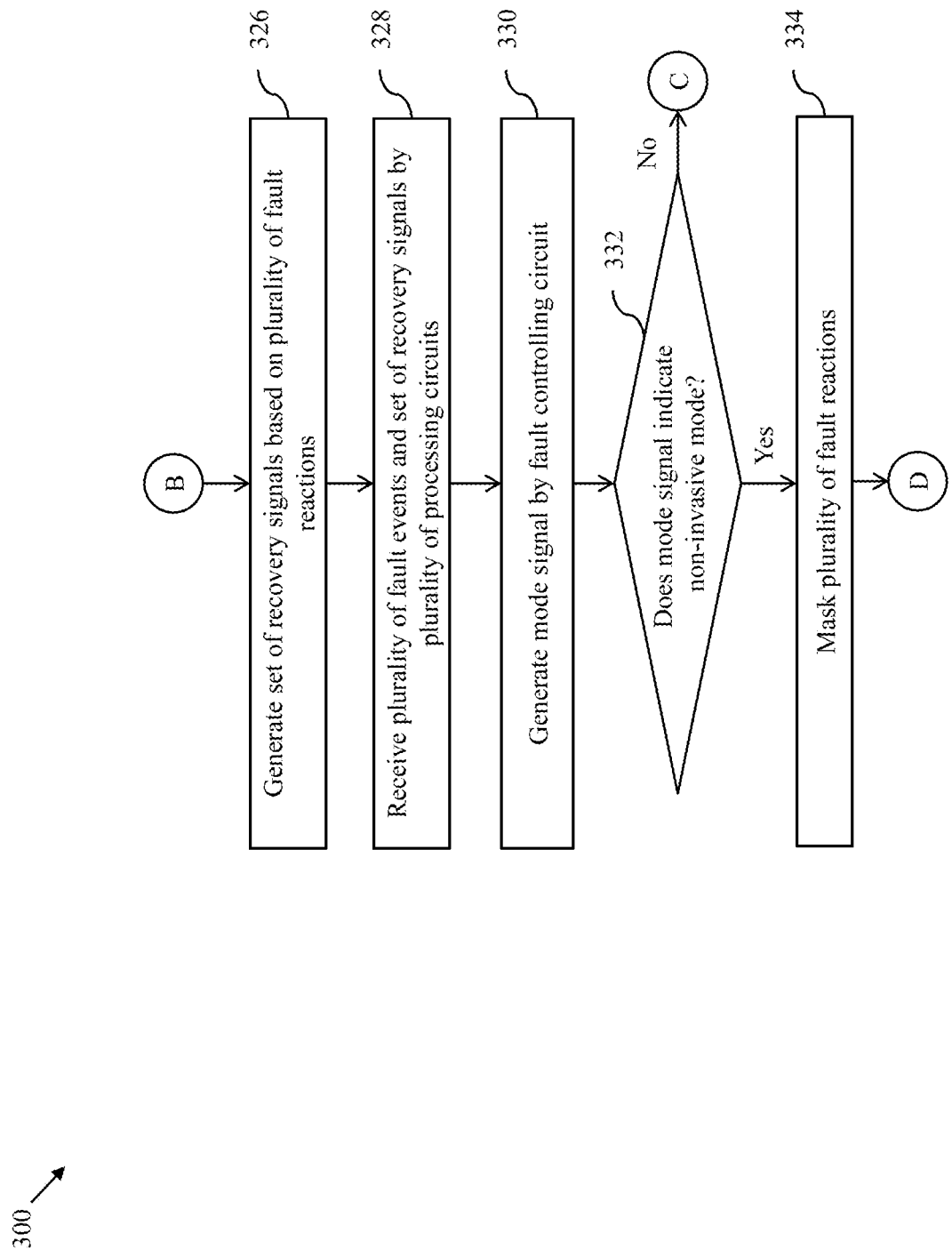

SYSTEM AND METHOD FOR CONTROLLING FAULTS IN SYSTEM-ON-CHIP

BACKGROUND

The present disclosure relates generally to electronic circuits, and, more particularly, to a system and a method for controlling faults in a system-on-chip (SoC).

An SoC includes multiple signal generation sources (such as a clock generator) that generate source signals (such as clock signals) to control operations of various components on the SoC. When the signal generation sources are faulty, the generated source signals cause fault events in the SoC. Such fault events propagate in the SoC through processing circuits that are coupled with the signal generation sources. To recover from such fault events, fault control systems are implemented in the SoC.

A conventional fault control system that controls faults in the SoC includes utilization of fault handling circuits in each processing circuit. In an example, a fault handling circuit of a processing circuit (such as a clock monitoring circuit) receives a fault event (such as a faulty clock signal) and generates and provides corresponding reaction to a fault handling circuit of the next processing circuit (such as a reset generation circuit). In response to the reaction, the next processing circuit generates a recovery signal and provides the recovery signal to the previous processing circuit, i.e., the fault handling circuit, to recover from the fault event. As a recovery route for each fault event implemented by such system is highly interdependent on each processing circuit, the recovery route for each fault event is thus long and unpredictable. In addition, if the next processing circuit is faulty and hence fails to generate the recovery signal, the previous processing circuit is unable to recover from the fault event. Thus, there is a need for a technical solution that solves the aforementioned problems of conventional fault control systems.

SUMMARY

In one embodiment, a system-on-chip (SoC) is disclosed. The SoC comprises a fault controlling circuit and a plurality of processing circuits. The fault controlling circuit is configured to receive a plurality of fault events and categorize the plurality of fault events based on a priority associated with each fault event of the plurality of fault events. The fault controlling circuit is further configured to identify a plurality of fault reactions based on the categorized plurality of fault events, and generate a set of recovery signals based on the plurality of fault reactions. The plurality of processing circuits are coupled with the fault controlling circuit, and configured to: (i) receive the plurality of fault events, and (ii) receive the set of recovery signals to recover from the plurality of fault events.

In another embodiment, a method for controlling faults in the SoC is disclosed. The method includes receiving, by the fault controlling circuit of the SoC, a plurality of fault events, and categorizing, by the fault controlling circuit, the plurality of fault events based on a priority associated with each fault event of the plurality of fault events. The method further includes identifying, by the fault controlling circuit, a plurality of fault reactions based on the categorized plurality of fault events, and generating, by the fault controlling circuit, a set of recovery signals based on the plurality of fault reactions. The method further includes receiving, by the plurality of processing circuits of the SoC, the plurality of fault events, and receiving, by the plurality of processing circuits, the set of recovery signals to recover from the plurality of fault events.

In some examples, the fault controlling circuit comprises an event categorization circuit that includes an event receiver and a priority categorization circuit. The event receiver is configured to receive the plurality of fault events and an indication signal, determine the priority associated with each fault event of the plurality of fault events to generate priority information associated with the plurality of fault events, and output the plurality of fault events and the priority information. The priority categorization circuit is coupled with the event receiver, and configured to receive the plurality of fault events and the priority information, and categorize each fault event of the plurality of fault events based on the priority information, and output the categorized plurality of fault events.

In some examples, the plurality of fault events include first and second fault events. When a priority of the first fault event is higher than a priority of the second fault event, the priority categorization circuit categorizes the first and second fault events as high and low priority fault events, and outputs the categorized first fault event before the categorized second fault event.

In some examples, the plurality of fault events include a third fault event having a low priority. When the priority categorization circuit receives the third fault event for a plurality of times within a predefined time interval, the priority categorization circuit categorizes the third fault event as a high priority fault event.

In some examples, the SoC further comprises a plurality of fault sources that are coupled with the event receiver and the plurality of processing circuits, and configured to generate and provide the plurality of fault events to the event receiver and the plurality of processing circuits.

In some examples, the fault controlling circuit further comprises a fault injection controller and a fault injector. The fault injection controller is configured to generate a test signal. The fault injector is coupled with the fault injection controller, the plurality of fault sources, and the event receiver, and configured to receive the test signal, generate and inject a plurality of fault inputs in the plurality of fault sources based on the test signal, and generate and provide the indication signal to the event receiver when the plurality of fault inputs are injected in the plurality of fault sources.

In some examples, the fault controlling circuit further comprises a reaction identification circuit and a recovery circuit. The reaction identification circuit is coupled with the priority categorization circuit, and configured to receive the categorized plurality of fault events and identify the plurality of fault reactions. The recovery circuit is coupled with the reaction identification circuit, and configured to receive the plurality of fault reactions and generate the set of recovery signals based on a mapping of each fault reaction of the plurality of fault reactions with a corresponding recovery signal of the set of recovery signals.

In some examples, the reaction identification circuit includes a lookup table that is configured to store fault information associated with each fault event of the plurality of fault events, and a mapping of each fault event with a corresponding fault reaction of the plurality of fault reactions. The reaction identification circuit identifies the plurality of fault reactions based on the mapping of each fault event with the corresponding fault reaction of the plurality of fault reactions.

In some examples, the reaction identification circuit is further configured to receive reaction information. The reaction identification circuit identifies the plurality of fault reactions based on the reaction information.

In some examples, the fault controlling circuit further comprises a masking controller and a masking circuit. The masking controller is configured to generate a mode signal. The mode signal is indicative of at least one of a non-invasive mode and an invasive mode. The masking circuit is coupled with the reaction identification circuit and the masking controller, and configured to receive the plurality of fault reactions and the mode signal, mask the plurality of fault reactions when the mode signal indicates the non-invasive mode, and output the plurality of fault reactions when the mode signal indicates the invasive mode.

In some examples, the plurality of processing circuits are coupled with the masking circuit, and configured to receive the plurality of fault reactions when the mode signal indicates the invasive mode, and generate a plurality of output signals. The reaction identification circuit is further configured to receive the plurality of output signals and generate diagnostic information based on the categorized plurality of fault events, the plurality of fault reactions, and the plurality of output signals.

In some examples, the fault controlling circuit further comprises an interface circuit that is coupled with the reaction identification circuit, and configured to: (i) receive and output the diagnostic information and status information, (ii) receive and provide, to the reaction identification circuit, reaction information to identify the plurality of fault reactions, and (iii) receive a trigger signal that is indicative of initiating a test mode of the SoC. The reaction identification circuit is further configured to generate the status information that indicates at least one of the reception of the plurality of fault events, the generation of the plurality of fault reactions, and the generation of the set of recovery signals.

Various embodiments of the present disclosure disclose a system-on-chip (SoC). The SoC comprises fault sources, a fault controlling circuit, and processing circuits. The fault sources are configured to generate fault events. The fault controlling circuit is configured to receive the fault events, categorize the fault events based on a priority associated with each fault event, identify fault reactions associated with the categorized fault events such that each fault reaction is associated with a corresponding fault event, and generate recovery signals based on the identified fault reactions. The processing circuits are configured to receive the fault events and the set of recovery signals that enable the processing circuits to recover from the fault events.

The fault controlling circuit thus acts as a central control system for controlling faults as compared to conventional systems for controlling faults that utilize scattered fault handling circuits in each processing circuit. Further, as a recovery route for each fault event is determined by the fault controlling circuit, the recovery route for each fault event is thus unique and fast, as compared to the conventional systems for controlling faults. Furthermore, as the processing circuits are capable of recovering from the fault events based on the set of recovery signals that are generated by the fault controlling circuit, the processing circuits do no rely on each other to generate the set of recovery signals.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIGS. 3A-3D, collectively, represent a flow chart that illustrates a method for controlling faults in the SoC of FIG. 1 in accordance with an embodiment of the present disclosure.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
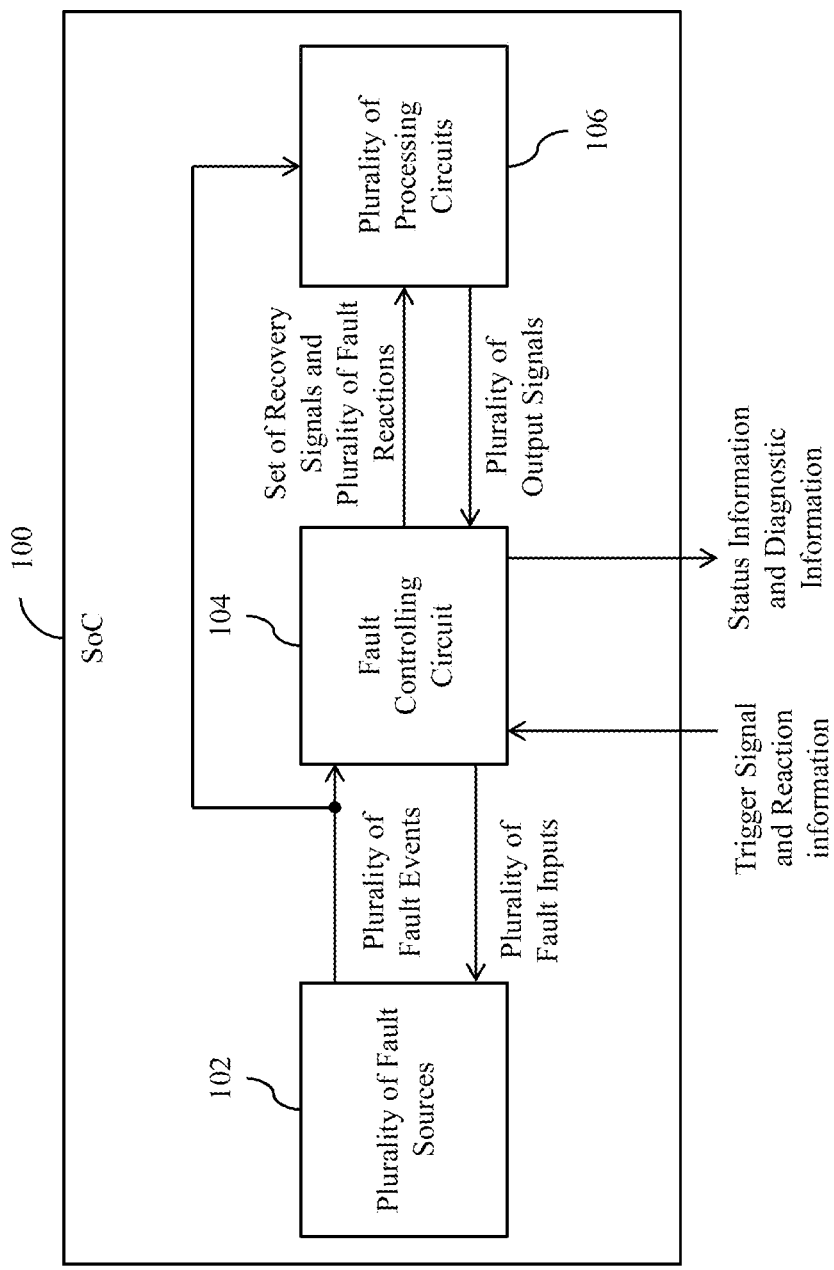
FIG. 1 is a block diagram of a system-on-chip (SOC) in accordance with an embodiment of the present disclosure.

FIG. 1 is a block diagram of a system-on-chip (SoC) 100 in accordance with an embodiment of the present disclosure. The SoC 100 is a multi-core SoC that may be utilized in an automotive application such as an advanced driver assistance system (ADAS), a consumer application such as a home security system, or an industrial application such as an industrial robotic system. The SoC 100 is configured to operate in at least one of a functional mode and a test mode. The functional mode of the SoC 100 corresponds to a normal operating mode of the SoC 100 or a non-testing mode of the SoC 100. The test mode of the SoC 100 corresponds to testing of one or more components of the SoC 100. The SoC 100 includes a plurality of fault sources 102, a fault controlling circuit 104, and a plurality of processing circuits 106.

The plurality of fault sources 102 are configured to generate a plurality of fault events. Each fault event of the plurality of fault events indicates a fault in a corresponding fault source of the plurality of fault sources 102. In one example, a first fault event of the plurality of fault events indicates that a first fault source of the plurality of fault sources 102 generates a faulty signal (e.g., a clock signal with an error in a frequency of the clock signal). In another example, a second fault event of the plurality of fault events indicates that a second fault source of the plurality of fault sources 102 fails to generate an output (e.g., a reset signal) to complete a reset operation associated with the SoC 100.

During the functional mode of the SoC 100, the plurality of fault sources 102 generate the plurality of fault events when the plurality of fault sources 102 are faulty (i.e., the plurality of fault sources 102 are defective or not working correctly). During the test mode of the SoC 100, a plurality of fault inputs are injected in the plurality of fault sources 102. Further, during the test mode, the plurality of fault sources 102 generate the plurality of fault events based on the plurality of fault inputs. Each fault input of the plurality of fault inputs indicates a pseudo fault event to be generated by a corresponding fault source of the plurality of fault sources 102.

The plurality of fault sources 102 are coupled with the fault controlling circuit 104 and the plurality of processing circuits 106. The plurality of fault sources 102 are further configured to provide the plurality of fault events to the fault controlling circuit 104 and the plurality of processing circuits 106. Examples of the plurality of fault sources 102 include a clock distribution circuit, a crystal oscillator, a phase locked loop, a clock generator, and the like.

The fault controlling circuit 104 is a central controller that is coupled with the plurality of fault sources 102, and configured to collect, i.e., receive the plurality of fault events. The fault controlling circuit 104 is further configured to receive a trigger signal and reaction information. The trigger signal is indicative of initiating the test mode. In one embodiment, the trigger signal is received by the fault controlling circuit 104 from a processing core (not shown) that is external to the SoC 100. Based on the trigger signal, the fault controlling circuit 104 is further configured to generate and inject the plurality of fault inputs in the plurality of fault sources 102 to receive the plurality of fault events. The reaction information includes a configurable mapping of each of the plurality of fault events with a corresponding fault reaction. The reaction information is received by the fault controlling circuit 104 from the processing core. In one embodiment, each fault reaction indicates a predetermined response of the SoC 100 to a corresponding fault event.

The fault controlling circuit 104 is further configured to output a plurality of fault reactions. To output the plurality of fault reactions, the fault controlling circuit 104 is further configured to identify the plurality of fault reactions associated with the categorized plurality of fault events based on the received reaction information. In one example, when the fault event is a timeout fault event associated with a timeout circuit (not shown) of the SoC 100, a corresponding fault reaction is to execute a destructive reset on the timeout circuit.

The fault controlling circuit 104 is further configured to generate, based on the identified plurality of fault reactions, a set of recovery signals to recover the SoC 100 from the plurality of fault events, thereby controlling faults due to the plurality of fault events in the SoC 100. In one example, a first recovery signal of the set of recovery signals corresponds to a power-on reset signal. In another example, the first recovery signal of the set of recovery signals corresponds to a functional reset signal. In yet another example, the first recovery signal of the set of recovery signals corresponds to a destructive reset signal. The fault controlling circuit 104 thus determines a recovery route for each fault event such that the recovery route for each fault event is unique, fast, and predictable.

The fault controlling circuit 104 is further coupled with the plurality of processing circuits 106, and configured to provide the plurality of fault reactions and the set of recovery signals to the plurality of processing circuits 106, and receive a plurality of output signals. For example, when a fault reaction is to execute a destructive reset on the timeout circuit, the fault controlling circuit 104 generates the first recovery signal as the destructive reset signal. Based on the first recovery signal, the destructive reset is executed on the timeout circuit such that the timeout circuit recovers from the timeout fault event. The fault controlling circuit 104 generates the first recovery signal that is received by the timeout circuit to recover from the timeout fault event as compared to conventional systems for controlling faults that depend on a watchdog circuit which causes a delay of a predetermined time, say '120' milliseconds, to recover from a timeout fault event. Thus, the recovery route determined by the fault controlling circuit 104 requires less time as compared to a recovery route determined by the conventional systems for controlling faults. Further, based on the first recovery signal, as the destructive reset is executed on the timeout circuit and the entire SoC 100 is not reset, thus the recovery route determined by the fault controlling circuit 104 does not cause a delay in an operation of the SoC 100.

The fault controlling circuit 104 is further configured to generate diagnostic information and status information. The diagnostic information is generated based on the plurality of fault events, the plurality of fault reactions, and the plurality of output signals. The diagnostic information includes a record of each fault event received by the fault controlling circuit 104, a fault reaction that is identified for each fault event, and recovery signals generated to recover from each fault event. The status information indicates at least one of the reception of the plurality of fault events, the generation of the plurality of fault reactions, and the generation of the set of recovery signals. In one example, the diagnostic information and the status information are provided to the processing core. The structure and working of the fault controlling circuit 104 are explained in detail in conjunction with FIG. 2.

The plurality of processing circuits 106 are coupled with the plurality of fault sources 102, and configured to receive the plurality of fault events. The plurality of processing circuits 106 are further coupled with the fault controlling circuit 104, and further configured to receive the set of recovery signals to recover from the plurality of fault events. In one example, the set of recovery signals reset the plurality of processing circuits 106 to recover from the plurality of fault events. In another example, the set of recovery signals indicate the plurality of processing circuits 106 to reset the SoC 100 such that the plurality of processing circuits 106 recover from the plurality of fault events. Further, the plurality of processing circuits 106 are configured to receive the plurality of fault reactions and generate the plurality of output signals. Each output signal of the plurality of output signals corresponds to a response of a corresponding processing circuit of the plurality of processing circuits 106 to a corresponding fault event of the plurality of fault events. Examples of the plurality of processing circuits 106 include a clock monitoring circuit, a reset control circuit, an intellectual property core, a watchdog circuit, and the like.

Figure 2:
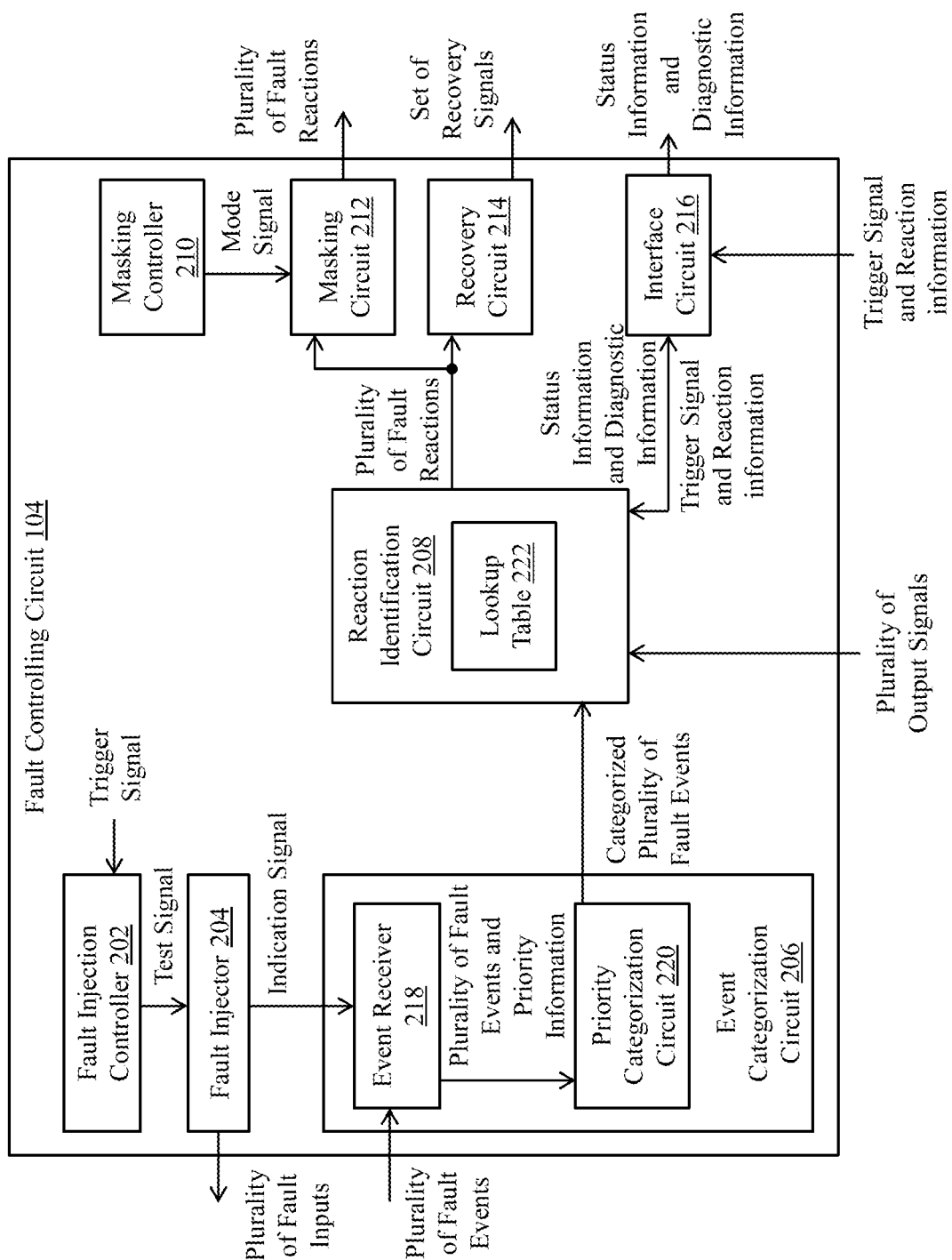
FIG. 2 is a block diagram of a fault controlling circuit of the SoC of FIG. 1 in accordance with an embodiment of the present disclosure.
Figure 3A:
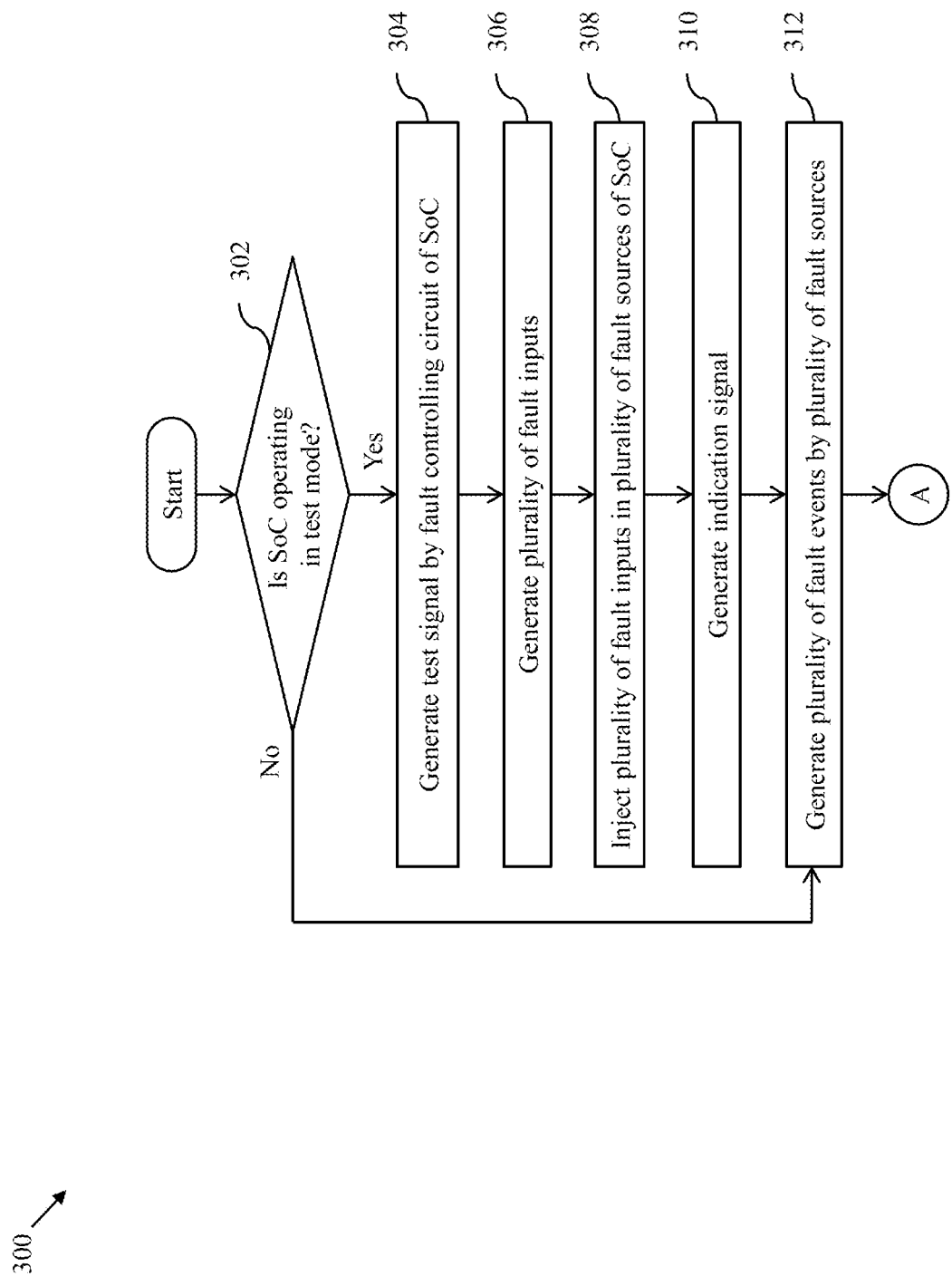
Figure 3B:
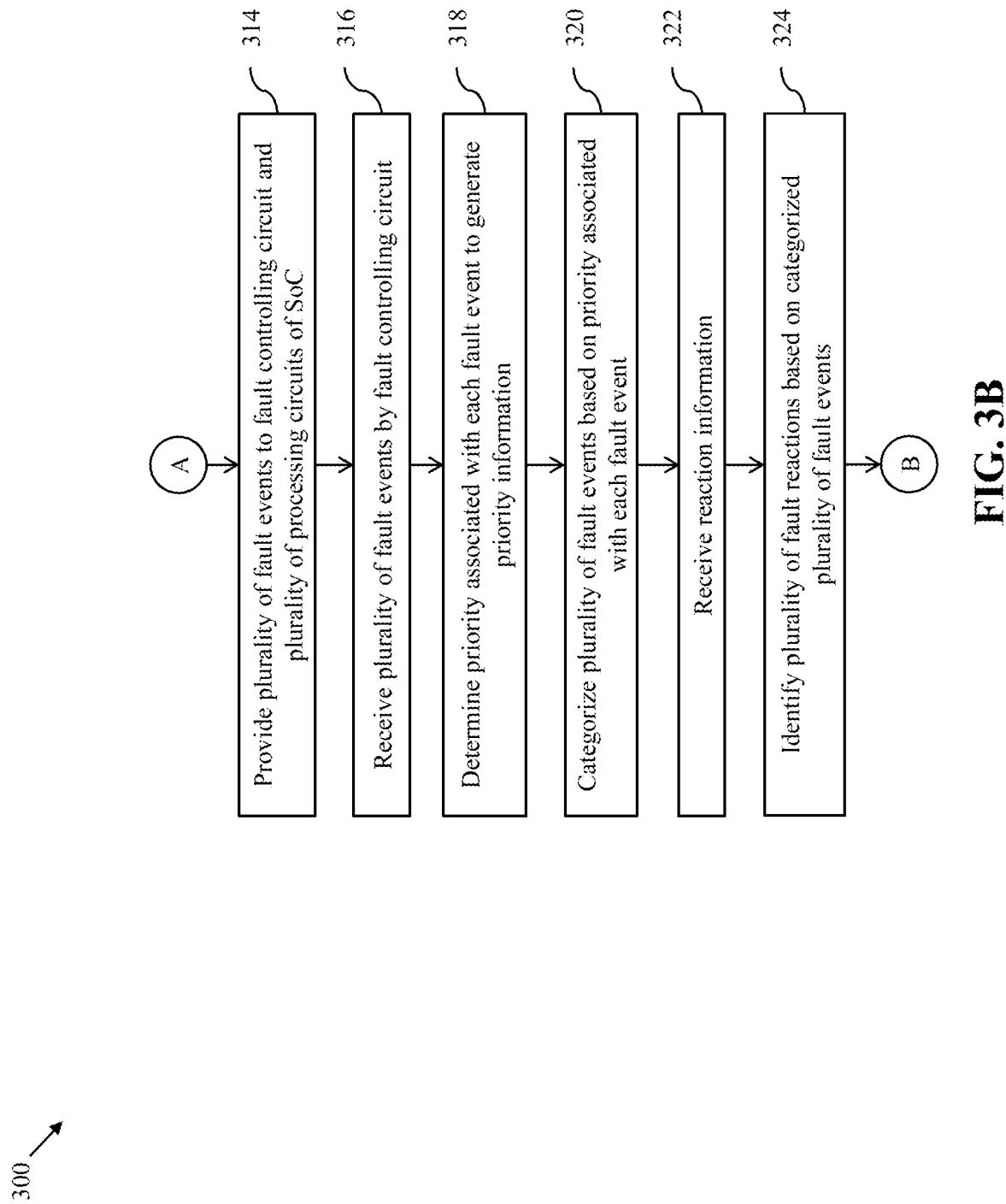
Figure 3D:
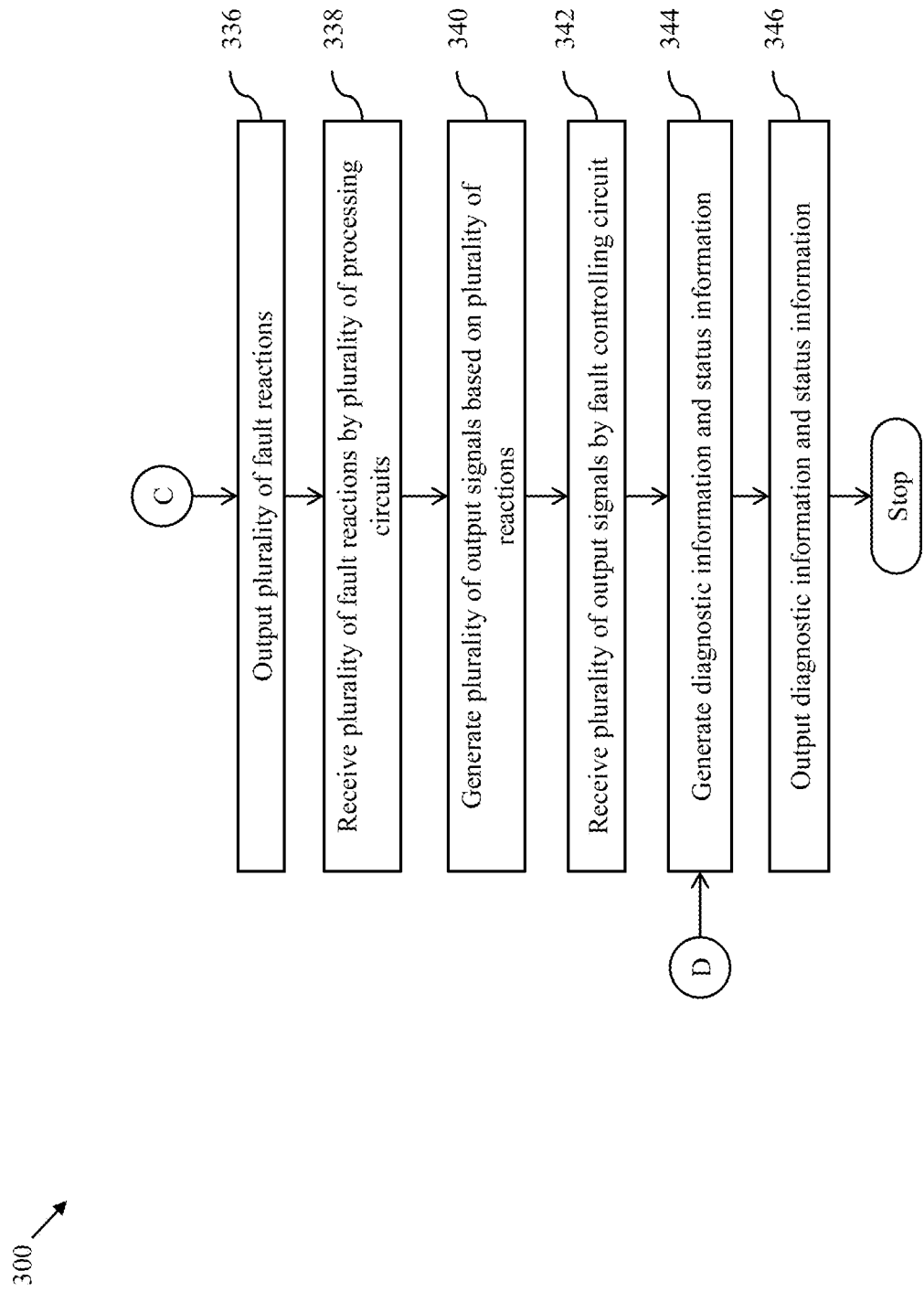

FIG. 2 is a block diagram of the fault controlling circuit 104 in accordance with an embodiment of the present disclosure. The fault controlling circuit 104 includes a fault injection controller 202, a fault injector 204, an event categorization circuit 206, a reaction identification circuit 208, a masking controller 210, a masking circuit 212, a recovery circuit 214, and an interface circuit 216.

The fault injection controller 202 may include suitable circuitry that is configured to receive the trigger signal and generate a test signal. In one embodiment, the fault injection controller 202 generates the test signal when the trigger signal is received. In another embodiment, the fault injection controller 202 generates the test signal periodically to test the SoC 100. In one example, the processing core generates the trigger signal and the fault injection controller 202 receives the trigger signal from the processing core by way of the interface circuit 216. In another example, an internal core (not shown) of the fault controlling circuit 104 is configured to generate the trigger signal and the fault injection controller 202 receives the trigger signal from the internal core.

The fault injector 204 may include suitable circuitry that is configured to perform one or more operations. The fault injector 204 is coupled with the fault injection controller 202 and the plurality of fault sources 102, and configured to receive the test signal, and generate and inject the plurality of fault inputs in the plurality of fault sources 102 based on the test signal. Further, the fault injector 204 is coupled with the event categorization circuit 206, and configured to generate and provide an indication signal to the event categorization circuit 206 when the plurality of fault inputs are injected in the plurality of fault sources 102.

The event categorization circuit 206 is coupled with the plurality of fault sources 102 and the fault injector 204, and configured to receive the plurality of fault events and the indication signal. The event categorization circuit 206 is further configured to categorize the plurality of fault events based on a priority associated with each fault event, and output the categorized plurality of fault events. The event categorization circuit 206 includes an event receiver 218 and a priority categorization circuit 220.

The event receiver 218 includes suitable circuitry that is configured to perform one or more operations. The event receiver 218 is coupled with the plurality of fault sources 102 and the fault injector 204, and configured to receive the plurality of fault events and the indication signal and determine the priority associated with each fault event to generate priority information associated with the plurality of fault events. The priority information indicates a high priority or a low priority of each fault event and a sequence in which each fault event of the plurality of fault events need to be outputted. In one example, the priority information indicates that a fault event of the plurality of fault events that has a high priority needs to be outputted before a fault event of the plurality of fault events that has a low priority. To determine the high or low priority associated with each fault event, the event receiver 218 is further configured to determine, based on the indication signal, whether each fault event of the plurality of fault events is associated with the functional mode of the SoC 100 or the test mode of the SoC 100, i.e., whether each fault event is generated in the functional mode or the test mode of the SoC 100. In one example, the plurality of fault events includes the first and second fault events such that the first fault event is associated with the functional mode of the SoC 100 and the second fault event is associated with the test mode of the SoC 100. In such a scenario, the priority information indicates that a priority of the first fault event is higher than a priority of the second fault event. The event receiver 218 is further configured to output the plurality of fault events and the priority information.

The priority categorization circuit 220 may include suitable circuitry that may be configured to perform one or more operations. The priority categorization circuit 220 is coupled with the event receiver 218, and configured to receive the plurality of fault events and the priority information, categorize each fault event of the plurality of fault events into high and low priority fault events, and output the categorized plurality of fault events. In an embodiment, the priority categorization circuit 220 categorizes each fault event based on the priority information. In one example, the priority categorization circuit 220 categorizes first and third fault events of the plurality of fault events as high priority fault events when a priority of the first and third fault events is higher than a priority of second and fourth fault events. Further, the priority categorization circuit 220 outputs the categorized first and third fault events before the categorized second and fourth fault events. In another embodiment, the priority categorization circuit 220 categorizes the received fault event based on a number of times the fault event is received. In an example, the plurality of fault events include a fifth fault event having a low priority. When the priority categorization circuit 220 receives the fifth fault event for a plurality of times within a predefined time interval, the priority categorization circuit 220 categorizes the fifth fault event as a high priority fault event. In yet another embodiment, the priority categorization circuit 220 categorizes a fault event of the plurality of fault events further based on a corresponding fault source of the plurality of fault sources 102 that generates the fault event. In one example, the priority categorization circuit 220 categorizes all fault events generated by the clock generator as high priority fault events and all faults events generated by the clock distribution circuit as low priority fault events.

The reaction identification circuit 208 may include suitable circuitry that may be configured to perform one or more operations. The reaction identification circuit 208 is coupled with the priority categorization circuit 220, and configured to receive the categorized plurality of fault events and identify the plurality of fault reactions for the categorized plurality of fault events. Further, the reaction identification circuit 208 includes a lookup table 222 that is configured to store fault information associated with each fault event, and a mapping of each fault event with a corresponding fault reaction of the plurality of fault reactions. The fault information associated with each fault event indicates a type of fault event and a corresponding fault source of the plurality of fault sources 102 that generates each fault event. The reaction identification circuit 208 is further coupled with the interface circuit 216, and further configured to receive the trigger signal and the reaction information by way of the interface circuit 216. In one embodiment, the reaction identification circuit 208 identifies the plurality of fault reactions based on the mapping of each fault event of the plurality of fault events with the corresponding fault reaction of the plurality of fault reactions that is stored in the lookup table 222. In another embodiment, the reaction identification circuit 208 identifies the plurality of fault reactions based on the reaction information. The trigger signal indicates the reaction identification circuit 208 that the SoC 100 is operating in the test mode.

The reaction identification circuit 208 is further configured to receive the plurality of output signals and generate the diagnostic information based on the categorized plurality of fault events, the plurality of fault reactions, and the plurality of output signals. The reaction identification circuit 208 is further configured to store the diagnostic information in a non-volatile memory (not shown) of the fault controlling circuit 104. The reaction identification circuit 208 is further configured to generate the status information and provide the diagnostic information and the status information to the processing core or another SoC by way of the interface circuit 216.

The masking controller 210 may include suitable circuitry that may be configured to perform one or more operations. The masking controller 210 is configured to generate a mode signal. The mode signal is indicative of at least one of a non-invasive mode and an invasive mode. In the non-invasive mode, the masking circuit 212 masks (i.e., does not output) the plurality of fault reactions. In the invasive mode, the masking circuit 212 outputs (i.e., does not mask) the plurality of fault reactions. The masking controller 210 generates the mode signal during both the functional and test modes of the SoC 100.

The masking circuit 212 may include suitable circuitry that may be configured to perform one or more operations. The masking circuit 212 is coupled with the reaction identification circuit 208 and the masking controller 210, and configured to receive the plurality of fault reactions and the mode signal. Further, the masking circuit 212 is configured to mask, i.e., not output, the plurality of fault reactions when the mode signal indicates the non-invasive mode. Conversely, the masking circuit 212 is configured to output the plurality of fault reactions when the mode signal indicates the invasive mode. The plurality of processing circuits 106 are further coupled with the masking circuit 212, and receive the plurality of fault reactions when the mode signal indicates the invasive mode, and generate the plurality of output signals.

The recovery circuit 214 may include suitable circuitry that may be configured to perform one or more operations. The recovery circuit 214 is coupled with the reaction identification circuit 208, and configured to receive the plurality of fault reactions and generate the set of recovery signals. In one embodiment, the recovery circuit 214 further configured to receive and store a recovery table that defines a mapping of each fault reaction of the plurality of fault reactions with a corresponding recovery signal of the set of recovery signals. The recovery circuit 214 generates the set of recovery signals based on the mapping of each fault reaction of the plurality of fault reactions with a corresponding recovery signal of the set of recovery signals defined in the recovery table. In one example, more than two fault reactions of the plurality of fault reactions correspond to a single recovery signal of the set of recovery signals. In another example, each fault reaction of the plurality of fault reactions corresponds to a single recovery signal of the set of recovery signals. The recovery circuit 214 is further configured to provide the set of recovery signals to the plurality of processing circuits 106 to recover from the plurality of fault events, thereby controlling faults due to the plurality of fault events in the SoC 100.

The interface circuit 216 may include suitable circuitry that may be configured to transmit signals and information between various entities, such as the fault injection controller 202, the reaction identification circuit 208, and/or the processing core of another SoC. The interface circuit 216 is coupled with the reaction identification circuit 208, and configured to receive and output the diagnostic information and the status information. Further, the interface circuit 216 is further configured to receive and provide, to the reaction identification circuit 208, the trigger signal and the reaction information to identify the plurality of fault reactions. The interface circuit 216 is further coupled with the fault injection controller 202, and further configured to provide, to the fault injection controller 202, the trigger signal to initiate the test mode of the SoC 100 (i.e., to indicate the fault injector 204 to generate and inject the plurality of fault inputs in the plurality of fault sources 102).

FIGS. 3A-3D, collectively, represent a flow chart 300 that illustrates a method for controlling faults in the SoC 100 in accordance with an embodiment of the present disclosure.

At step 302, the fault controlling circuit 104 determines whether the SoC 100 is operating in the test mode. In one embodiment, the fault controlling circuit 104 determines whether the SoC 100 is operating in the test mode based on the reception of the trigger signal by the fault controlling circuit 104. If at step 302, the fault controlling circuit 104 determines that the SoC 100 is operating in the test mode, step 304 is executed. At step 304, the fault controlling circuit 104 generates the test signal that indicates the fault controlling circuit 104 to generate and inject the plurality of fault inputs in the plurality of fault sources 102.

At step 306, the fault controlling circuit 104 generates the plurality of fault inputs. At step 308, the fault controlling circuit 104 injects the plurality of fault inputs in the plurality of fault sources 102 based on the generated test signal. At step 310, the fault controlling circuit 104 generates the indication signal when the plurality of fault inputs are injected in the plurality of fault sources 102. If at step 302, the fault controlling circuit 104 determines that the SoC 100 is not operating in the test mode (i.e., the SoC 100 is operating in the functional mode), step 312 is executed after step 302.

At step 312, the plurality of fault sources 102 generate the plurality of fault events. At step 314, the plurality of fault sources 102 provide the plurality of fault events to the fault controlling circuit 104 and the plurality of processing circuits 106. At step 316, the fault controlling circuit 104 receives the plurality of fault events. At step 318, the fault controlling circuit 104 determines the priority associated with each fault event to generate the priority information associated with the plurality of fault events. At step 320, the fault controlling circuit 104 categorizes the plurality of fault events based on the priority associated with each fault event.

At step 322, the fault controlling circuit 104 receives the reaction information. At step 324, the fault controlling circuit 104 identifies the plurality of fault reactions based on the categorized plurality of fault events. In one embodiment, the plurality of fault reactions are identified by the fault controlling circuit 104 based on the mapping of each fault event of the plurality of fault events with the corresponding fault reaction of the plurality of fault reactions that is stored in the lookup table 222. In another embodiment, the plurality of fault reactions are identified by the fault controlling circuit 104 further based on the reaction information.

At step 326, the fault controlling circuit 104 generates the set of recovery signals based on the plurality of fault reactions. At step 328, the plurality of processing circuits 106 receive the plurality of fault events and the set of recovery signals. The plurality of processing circuits 106 receive the set of recovery signals to recover from the plurality of fault events. Thus, the faults in the SoC 100 due to the plurality of fault events are controlled by the fault controlling circuit 104.

At step 330, the fault controlling circuit 104 generates the mode signal. The mode signal is indicative of at least one of the non-invasive mode and the invasive mode. At step 332, the fault controlling circuit 104 determines whether the mode signal indicates the non-invasive mode. If at step 332, the fault controlling circuit 104 determines that the mode signal indicates the non-invasive mode, step 334 is executed. At step 334, the fault controlling circuit 104 masks the plurality of fault reactions. If at step 332, the fault controlling circuit 104 determines that the mode signal does not indicate the non-invasive mode (i.e., the mode signal indicates the invasive mode), step 336 is executed.

At step 336, the fault controlling circuit 104 outputs the plurality of fault reactions. At step 338, the plurality of processing circuits 106 receive the plurality of fault reactions. At step 340, the plurality of processing circuits 106 generate the plurality of output signals based on the plurality of fault reactions.

At step 342, the fault controlling circuit 104 receives the plurality of output signals. After steps 334 and 342, step 344 is executed. At step 344, the fault controlling circuit 104 generates the diagnostic information and the status information. The diagnostic information is generated based on the categorized plurality of fault events, the plurality of fault reactions, and the plurality of output signals. At step 346, the fault controlling circuit 104 outputs the diagnostic information and the status information.

The fault controlling circuit 104 thus acts as a central system to control the faults (i.e., the fault events) as compared to conventional systems for controlling faults that utilize scattered fault handling circuits in each processing circuit. As the fault controlling circuit 104 determines a recovery route for each fault event, the recovery route for each fault event is thus unique and fast as compared to the conventional systems for controlling faults. Further, the plurality of processing circuits 106 are capable of recovering from the plurality of fault events since there is no interdependence of the plurality of processing circuits 106 on each other for the generation of the set of recovery signals. In addition, the fault controlling circuit 104 may be utilized at different stages (such as verification, emulation, testing, validation, and customer code development stages) in the SoC 100 to recover from the plurality of fault events and test the SoC 100, thus, providing a robust and consistent solution to recover from the plurality of fault events and test the SoC 100.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A system-on-chip (SoC), comprising:
a fault controlling circuit that is configured to:
receive a plurality of fault events;
categorize the plurality of fault events based on a priority associated with each fault event of the plurality of fault events;
identify a plurality of fault reactions based on the categorized plurality of fault events; and
generate a set of recovery signals based on the plurality of fault reactions;
a masking controller that is configured to generate a mode signal, wherein the mode signal is indicative of at least one of a non-invasive mode and an invasive mode; and
a masking circuit that is coupled with a reaction identification circuit of the fault controlling circuit and the masking controller, and configured to receive the plurality of fault reactions and the mode signal, mask the plurality of fault reactions when the mode signal indicates the non-invasive mode, and output the plurality of fault reactions when the mode signal indicates the invasive mode.

2. The SoC of claim 1, wherein the fault controlling circuit comprises an event categorization circuit comprising:
an event receiver that is configured to receive the plurality of fault events and an indication signal, determine the priority associated with each fault event of the plurality of fault events to generate priority information associated with the plurality of fault events, and output the plurality of fault events and the priority information; and
a priority categorization circuit that is coupled with the event receiver, and configured to receive the plurality of fault events and the priority information, and categorize each fault event of the plurality of fault events based on the priority information, and output the categorized plurality of fault events.

3. The SoC of claim 2, wherein the plurality of fault events include first and second fault events, and wherein when a priority of the first fault event is higher than a priority of the second fault event, the priority categorization circuit categorizes the first and second fault events as high and low priority fault events, and outputs the categorized first fault event before the categorized second fault event.

4. The SoC of claim 2, wherein the plurality of fault events include a third fault event having a low priority, and wherein when the priority categorization circuit receives the third fault event for a plurality of times within a predefined time interval, the priority categorization circuit categorizes the third fault event as a high priority fault event.

5. The SoC of claim 2, further comprising a plurality of fault sources that are coupled with the event receiver and the plurality of processing circuits, and configured to generate and provide the plurality of fault events to the event receiver and the plurality of processing circuits.

6. The SoC of claim 5, wherein the fault controlling circuit further comprises:
a fault injection controller that is configured to generate a test signal; and
a fault injector that is coupled with the fault injection controller, the plurality of fault sources, and the event receiver, and configured to receive the test signal, generate and inject a plurality of fault inputs in the plurality of fault sources based on the test signal, and generate and provide the indication signal to the event receiver when the plurality of fault inputs are injected in the plurality of fault sources.

7. The SoC of claim 2, wherein the fault controlling circuit further comprises:
a reaction identification circuit that is coupled with the priority categorization circuit, and configured to receive the categorized plurality of fault events and identify the plurality of fault reactions; and
a recovery circuit that is coupled with the reaction identification circuit, and configured to receive the plurality of fault reactions and generate the set of recovery signals based on a mapping of each fault reaction of the plurality of fault reactions with a corresponding recovery signal of the set of recovery signals.

8. The SoC of claim 7, wherein the reaction identification circuit includes a lookup table that is configured to store fault information associated with each fault event of the plurality of fault events, and a mapping of each fault event with a corresponding fault reaction of the plurality of fault reactions, wherein the reaction identification circuit identifies the plurality of fault reactions based on the mapping of each fault event with the corresponding fault reaction of the plurality of fault reactions.

9. The SoC of claim 7, wherein the reaction identification circuit is further configured to receive reaction information, and wherein the reaction identification circuit identifies the plurality of fault reactions based on the reaction information.

10. The SoC of claim 1, wherein a plurality of processing circuits are coupled with the masking circuit, and configured to receive the plurality of fault reactions when the mode signal indicates the invasive mode, and generate a plurality of output signals, and wherein the reaction identification circuit is further configured to receive the plurality of output signals and generate diagnostic information based on the categorized plurality of fault events, the plurality of fault reactions, and the plurality of output signals.

11. The SoC of claim 10, wherein the fault controlling circuit further comprises an interface circuit that is coupled with the reaction identification circuit, and configured to: (i) receive and output the diagnostic information and status information, (ii) receive and provide, to the reaction identification circuit, reaction information to identify the plurality of fault reactions, and (iii) receive a trigger signal that is indicative of initiating a test mode of the SoC, and wherein the reaction identification circuit is further configured to generate the status information that indicates at least one of the reception of the plurality of fault events, the generation of the plurality of fault reactions, and the generation of the set of recovery signals.

12. A method for controlling faults in a system-on-chip (SoC), the method comprising:

receiving, by a fault controlling circuit of the SoC, a plurality of fault events;

categorizing, by the fault controlling circuit, the plurality of fault events based on a priority associated with each fault event of the plurality of fault events;

identifying, by the fault controlling circuit, a plurality of fault reactions based on the categorized plurality of fault events;

generating, by the fault controlling circuit, a set of recovery signals based on the plurality of fault reactions;

generating, by the fault controlling circuit, a mode signal, wherein the mode signal is indicative of at least one of a non-invasive mode and an invasive mode;

masking, by the fault controlling circuit, the plurality of fault reactions when the mode signal indicates the non-invasive mode;

outputting, by the fault controlling circuit, the plurality of fault reactions when the mode signal indicates the invasive mode;

receiving, by a plurality of processing circuits of the SoC, the plurality of fault events;

receiving, by the plurality of processing circuits, the set of recovery signals to recover from the plurality of fault events;

receiving, by the plurality of processing circuits, the plurality of fault reactions when the mode signal indicates the invasive mode; and generating, by the plurality of processing circuits, a plurality of output signals based on the plurality of fault reactions when the mode signal indicates the invasive mode.

13. The method of claim 12, further comprising determining, by the fault controlling circuit, the priority associated with each fault event of the plurality of fault events to generate priority information associated with the plurality of fault events, wherein each fault event is categorized based on the priority information.

14. The method of claim 13, further comprising:

generating, by a plurality of fault sources of the SoC, the plurality of fault events; and providing, by the plurality of fault sources, the plurality of fault events to the fault controlling circuit and the plurality of processing circuits.

15. The method of claim 14, further comprising:

generating, by the fault controlling circuit, a test signal;

injecting, based on the generated test signal, a plurality of fault inputs in the plurality of fault sources; and generating, by the fault controlling circuit, an indication signal when the plurality of fault inputs are injected in the plurality of fault sources.

16. The method of claim 12, wherein the plurality of fault reactions are identified by the fault controlling circuit based on a mapping of each fault event of the plurality of fault events with a corresponding fault reaction of the plurality of fault reactions that is stored in a lookup table of the fault controlling circuit.

17. The method of claim 12, further comprising receiving, by the fault controlling circuit, reaction information, and wherein the plurality of fault reactions are identified by the fault controlling circuit further based on the reaction information.

18. The method of claim 12, further comprising:

receiving, by the fault controlling circuit, the plurality of output signals;

generating, by the fault controlling circuit, diagnostic information based on the categorized plurality of fault events, the plurality of fault reactions, and the plurality of output signals; and outputting, by the fault controlling circuit, the diagnostic information.

* * * * *